United States Patent

Maeshima et al.

[11] Patent Number: 5,402,177
[45] Date of Patent: Mar. 28, 1995

[54] INSERTING ADDITIVE VIDEO INFORMATION INTO A VIDEO SIGNAL THAT IDENTIFIES THE ASPECT RATIO OF THE SIGNAL

[75] Inventors: Yasuhito Maeshima, Aichi; Masayuki Suematsu; Masahiro Nakano, both of Tokyo; Morio Usami, Kanagawa, all of Japan

[73] Assignee: Sony Corporation, Tokyo, Japan

[21] Appl. No.: 50,804

[22] Filed: Apr. 22, 1993

[30] Foreign Application Priority Data

May 29, 1992 [JP] Japan .................................. 4-161861

[51] Int. Cl.⁶ .................. H04N 7/087; H04N 5/445
[52] U.S. Cl. ................................. 348/476; 348/445; 348/563
[58] Field of Search ............... 358/180, 183, 140, 142, 358/147, 183; H04N 7/01, 5/262, 5/272, 5/265, 5/445, 7/08, 7/087; 348/445, 458, 460, 461, 556, 563, 569, 913, 476

[56] References Cited

U.S. PATENT DOCUMENTS

| | | |
|---|---|---|
| 4,605,964 | 8/1986 | Chard ............................ 358/147 |
| 4,729,012 | 3/1988 | Jose et al. .................... 358/140 X |
| 4,800,426 | 1/1989 | Glenn ........................... 358/147 X |
| 4,935,815 | 6/1990 | Ichikawa et al. .................... 358/140 |
| 5,001,562 | 3/1991 | Tabata et al. ....................... 358/140 |
| 5,047,839 | 9/1991 | Sawada ........................... 358/183 X |
| 5,070,404 | 12/1991 | Bullock et al. ................. 358/147 X |
| 5,136,398 | 8/1992 | Rodriguez-Cavazos et al. ... 358/180 X |
| 5,231,490 | 7/1993 | Park ................................... 358/140 |

FOREIGN PATENT DOCUMENTS

| | | | |
|---|---|---|---|
| 0143780 | 6/1990 | Japan ........................... H04N 5/445 |
| 2257325 | 1/1993 | United Kingdom ........ H04N 7/087 |

Primary Examiner—Victor R. Kostak
Assistant Examiner—John W. Miller
Attorney, Agent, or Firm—Jay H. Maioli

[57] ABSTRACT

An additive video information inserting device includes a MUSE-NTSC converter, and an additive video information encoder for receiving an output video signal of the MUSE-NTSC converter and inserting into the video signal an additive video information indicating a frame mode for the video signal. The additive video information is so set as to correspond to a frame mode in a conversion operation of the MUSE-NTSC converter. The additive video information is inserted into a predetermined position in a vertical blanking period of the video signal.

18 Claims, 2 Drawing Sheets

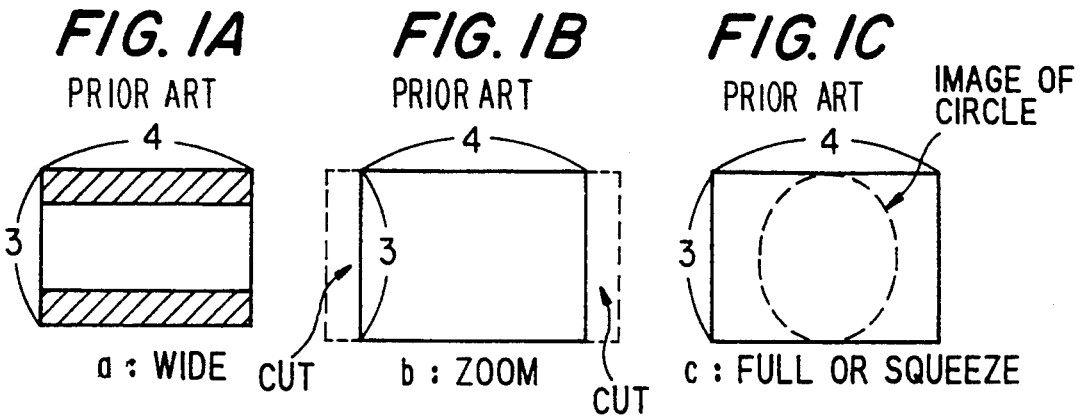
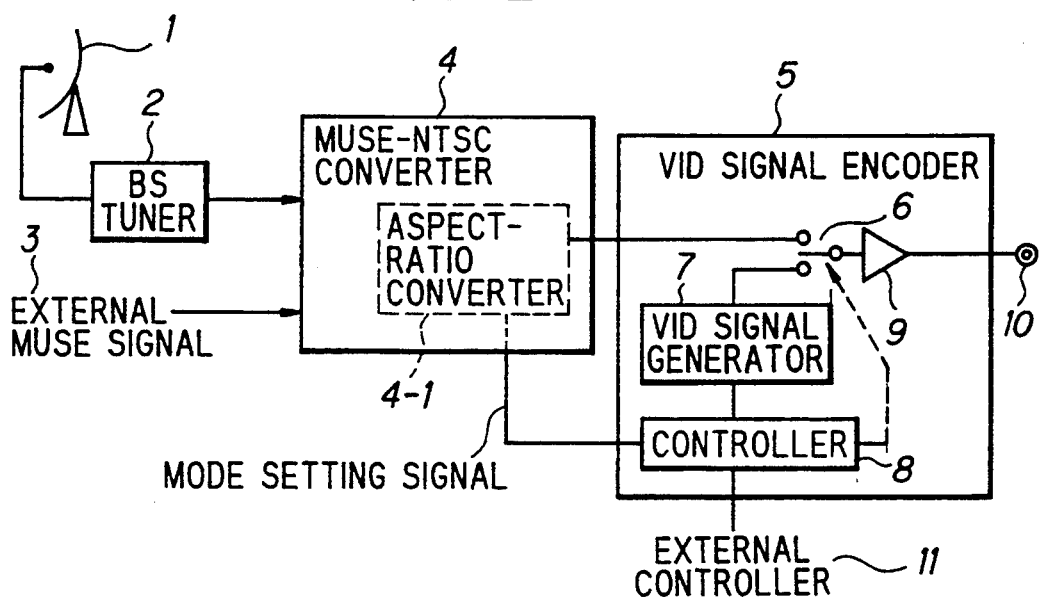
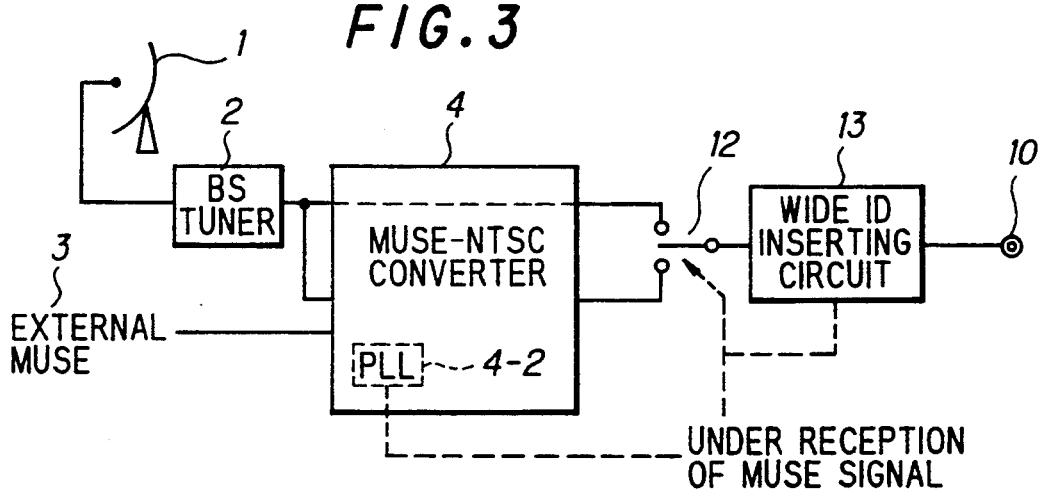

INSERTING ADDITIVE VIDEO INFORMATION INTO A VIDEO SIGNAL THAT IDENTIFIES THE ASPECT RATIO OF THE SIGNAL

BACKGROUND OF THE INVENTION

1. Field of the Invention

This invention relates to a device for inserting additive video information, and particularly to a device for inserting additive video information such as a video ID for identifying a video signal having different aspect ratio.

2. Description of Related Art

There has been recently utilized a video signal source such as so-called Hi-vision, which is used for video signals having aspect ratio different from that of the U.S.A. and Japanese standard television system, that is, NTSC system, and also there have been developed various types of video display equipments such as television image receivers for the NTSC system which can display pictures in various frame shapes.

In addition, in a converting operation of a Hi-vision video signal to a video signal of NTSC system, not only a fixed video-signal conversion processing for displaying a picture in a fixed frame shape is carried out, but also the video display can be performed in various frame shapes and various kinds of video signal conversion processings can be arbitrarily combined with each other. In view of the foregoing, it has been also required that television image receivers for displaying pictures are so designed as to be usable for the video signal sources which have been subjected to the various kinds of signal conversion processings as described above.

For example, in a so-called MUSE-NTSC converter for converting a Hi-vision video signal to a video signal of a standard system (NTSC system), a signal having aspect ratio of 16:9 which is transmitted in a MUSE mode is converted to a video signal of the NTSC system (whose aspect ratio is 4:3). In this case, when the signal having aspect ratio of 16:9 is required to be recorded or displayed by an equipment adopting the aspect ratio of 4:3 of the NTSC system which is a conventional format, various kinds of video display frame modes as shown in FIG. 1 can be used. In FIG. 1, a represents a wide-frame mode for inserting a picture of 16:9 aspect ratio into a frame of 4:3 aspect ratio in a reduced-scale, b represents a zoom-frame mode for cutting lateral sides of a picture of 16:9 aspect ratio to obtain a picture of 4:3 aspect ratio and displaying it, and c represents a full-frame or squeeze-frame mode for compressing a picture of 16:9 aspect ratio in a lateral direction and inserting the laterally-compressed picture into a frame of 4:3 aspect ratio.

Therefore, when the video signal thus converted is recorded and reproduced by a VTR, or when a Hi-vision broadcast is received and displayed by a television image receiver of 4:3 aspect ratio using an adapter such as a MUSE-NTSC converter, there would occur a case where the video signal is reproduced in an erroneous frame shape or in an erroneous aspect ratio unless the video signal processing is switched to a proper one in accordance with an output mode of the MUSE-NTSC converter or a display frame mode of a television image receiver for displaying a picture.

In this case, when the video signal is recorded by the VTR or reproduced (displayed) by the television image receiver using the adapter (MUSE-NTSC converter), there are required cumbersome operations for confirming the mode which has been set in the MUSE-NTSC converter, and switching the video signal processing in accordance with a display mode of the television image receiver for displaying a picture.

In addition, it has been proposed to transmit as an additive video information an information (video ID, VID) on identification of a video signal format of aspect ratio as described above by utilizing a vertical blanking period of a television signal. In practical use, an operation of inserting or adding the identification information as described above into the vertical blanking period of the video signal in accordance with the set mode of the MUSE-NTSC converter has been manually carried out at all times.

SUMMARY OF THE INVENTION

An object of this invention is to provide an additive video information inserting device for automatically inserting a video ID with which a video signal format of aspect ratio is identified.

The additive video information inserting device according to this invention includes a MUSE-NTSC converter, and an additive video information encoder for receiving an output video signal of the MUSE-NTSC converter and inserting into the video signal an additive video information indicating a frame mode for the video signal, the additive video information being so set as to correspond to a frame mode in a conversion operation of the MUSE-NTSC converter.

The additive video information is inserted into a predetermined position in a vertical blanking period of the video signal.

In addition to the insertion of the video additive information, a frame display information for enabling display of the frame mode indicated by the additive video information on a display screen (frame) may be synthesized with the video signal.

Particularly to a MUSE-NTSC converter for BS broadcasting reception is provided wide identification signal inserting means for inserting an additive video information indicating that the frame mode has aspect ratio corresponding to a wide frame. The wide identification signal inserting means is so designed that the actuation thereof is controlled on the basis of a signal indicating that the MUSE-NTSC converter conducts its conversion processing on a MUSE signal, thereby automatically inserting the wide identification signal.

According to the additive video information inserting device thus constructed, on a video signal whose aspect ratio is converted is superimposed an identification signal indicating a frame mode when the aspect ratio of the video signal is converted. Therefore, the video signal can be accurately reproduced and displayed by a television image receiver having an automatic identification function for the additive video information.

In addition, since the frame display information corresponding to the additive video information is synthesized with the video signal, a user having a television image receiver which is equipped with no automatic identification function can also know the frame mode of a signal source through the frame display information.

Further, since the additive video information is inserted into a vertical blanking period of the video signal, the additive video information is not lost even in a processing such as a recording/reproducing processing, a dubbing processing, a selection/combination processing of video signal sources or the like.

BRIEF DESCRIPTION OF THE DRAWINGS

FIG. 1 schematically shows some examples of a display frame mode;

FIG. 2 is a block diagram showing the construction of a MUSE-NTSC converter to which an additive video information inserting device of this invention is applied;

FIG. 3 is a block diagram showing the construction of a MUSE-NTSC converter for BS broadcasting reception to which the additive video information inserting device of this invention is applied;

DETAILED DESCRIPTION OF PREFERRED EMBODIMENTS

Figure 4:
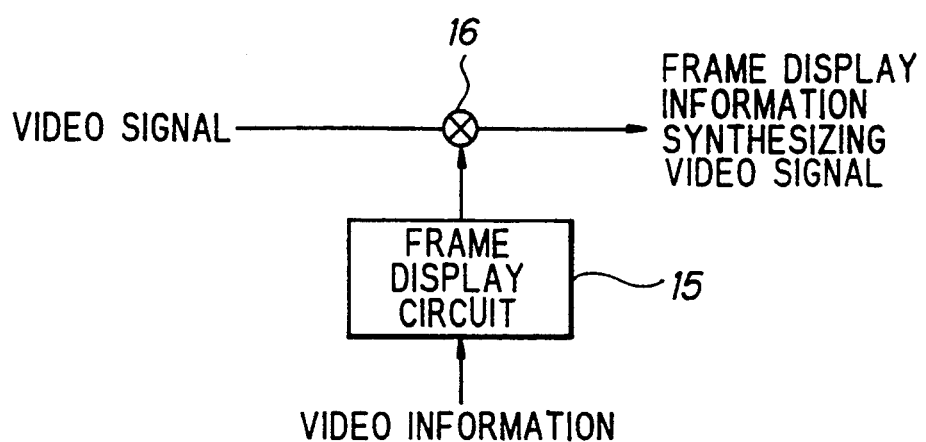
FIG. 4 is a block diagram showing the construction for adding a frame display information simultaneously with insertion of a VID signal in this invention.

Preferred embodiments according to this invention will be hereunder described with reference to the accompanying drawings.

FIG. 2 is a block diagram showing the construction of an embodiment in which this invention is applied to a MUSE-NTSC converter having a video signal conversion function for various kinds of frame modes in a conversion operation of aspect ratio.

In FIG. 2, a reference numeral 1 represents a BS antenna, a reference numeral 2 represents a BS tuner, a reference numeral 3 represents an external MUSE signal, a reference numeral 4 represents a MUSE-NTSC converter (hereinafter referred to as "M-N converter") having an aspect ratio converting unit 4-1, and a reference numeral 5 represents a VID signal encoder.

Here, the M-N converter 4 serves to receive a BS Hi-vision signal which is passed through the BS antenna 1 and the BS tuner 2, or a MUSE signal from an input signal source such as an external MUSE signal or the like, and selectively output NTSC signals of various kinds of frame modes of a speed conversion, an interpolating interlace conversion, an aspect ratio conversion (4-1), etc.

The VID signal encoder 5 comprises a change-over switch 6 for inserting a VID signal, a VID signal generator 7, a controller 8 and a buffer amplifier 9. The controller 8 is supplied with a control signal 11 from an external controller, and in response to the control signal it controls the M-N converter 4 and the VID signal generator 7.

With this construction, a conversion mode of the M-N converter 4 is set to any one of the modes as shown in FIG. 1, for example, and a VID signal corresponding to the set mode is generated from the VID signal generator 7. Simultaneously, the controller 8 controls the change-over switch 6 to insert the thus-generated VID signal into a predetermined position within a vertical blanking period of a video signal output from the M-N converter 4, so that the VID signal is synthesized with the video signal.

The composite signal thus synthesized is output through the buffer amplifier 9 to an output terminal or picture-recording terminal 10 as an NTSC signal including the video signal of the set frame mode and the added VID signal for the set mode.

FIG. 3 is a block diagram showing the construction of another embodiment in which this invention is applied to a Hi-vision signal receiving MUSE-NTSC converter for a general BS broadcasting. In FIG. 3, a reference numeral 1 represents a BS antenna, a reference numeral 2 represents a BS tuner, a reference numeral 3 represents an external MUSE signal input, a reference numeral 4 represents a general M-N converter which is used for BS broadcasting reception, and a reference numeral 10 represents an output terminal or a picture-recording terminal.

In this embodiment, the device is newly equipped with a change-over switch 12 for selecting any one of the BS output from the M-N converter and the Hi-vision signal which is subjected to the M-N conversion or the external MUSE signal output, and a wide ID insertion circuit 13, and these newly-equipped units are controlled on the basis of a control signal 14 indicating that reception of the MUSE signal is going on now.

As the control signal 14 indicating that the reception of the MUSE signal is going on now is used a control signal for switching the operation of the M-N converter 4 is used. For example, an output of a PLL circuit 4-2 for detecting a horizontal synchronizing signal and a frame pulse of the MUSE signal is usable.

With this construction, when a Hi-vision signal is received or an external MUSE signal is input, the wide ID insertion circuit 13 is automatically actuated to insert a wide ID signal into a vertical blanking period of an NTSC signal after conversion, and a video signal added with an ID signal indicating that the NTSC signal is obtained by the conversion of a MUSE signal having 16:9 aspect ratio is output at the output terminal or picture-recording terminal 10.

Therefore, if a video signal is input to a television image receiver which is equipped with a video display means having an ID-signal automatic identification function and aspect ratio of 16:9, the video signal can be displayed in aspect ratio of 4:3 when the video signal is an ordinary NTSC signal, and in aspect ratio of 16:9 when the video signal is obtained by converting a MUSE signal.

The video ID signal is inserted into a vertical blanking period of a converted video signal, so that no display is made for the video ID signal on a video display frame, and thus a user can not identify any signal source for the video signal. In order to avoid this disadvantage, a frame display information indicating a signal source may be added to the video signal simultaneously with the insertion of the video ID signal, so that the signal source can be identified even by a television image receiver having no automatic identification function for the video ID signal.

FIG. 4 is a block diagram showing the construction of a means for implementing the above idea. In this case, a frame display circuit 15 which is driven on the basis of a VID information is provided to synthesize a frame display information with a video signal after conversion.

Here, a frame display function of a microcomputer is usable for the frame display circuit 15. Upon receiving a video ID information, the microcomputer prepares a display information for a screen (frame), and adds the display information to the video signal in a video signal synthesizing circuit 16.

Figures 5A, 5B:
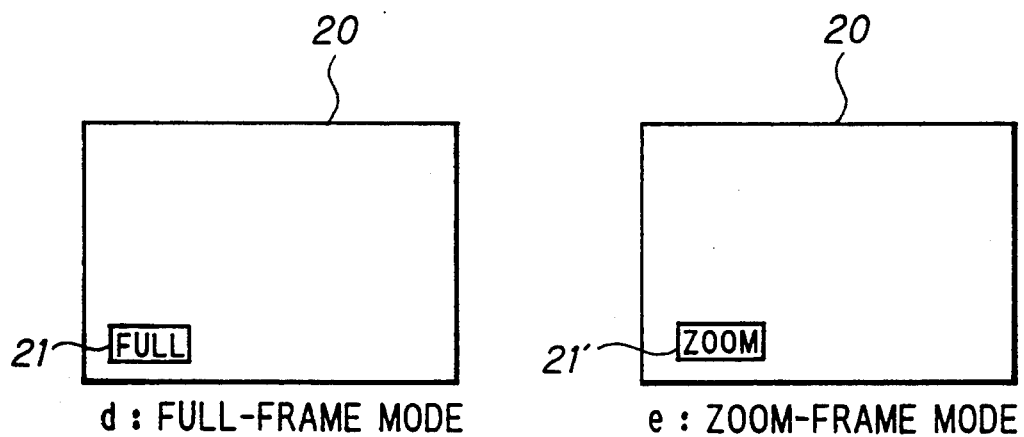
FIG. 5 shows display examples of the frame display information.

FIG. 5 shows display examples of the frame display information, and for example, a mark 21 indicating the full-frame mode (d) or a mark 21' indicating the zoom-frame mode (e) is displayed on a screen 20. In this case, each mark 21 (21') comprises a frame (figure, outline, shape, etc.) corresponding to a display-frame shape for a video signal to be displayed, thereby enabling a user to visually identify a frame mode. The display frame may be temporally displayed, and thus it may be erased if occasion demands. In place of the variation of the frame shape of the mark in accordance with a used mode, a display color may be varied in accordance with the used mode.

According to this invention, using a television image receiver having an automatic identification function for the VID signal, the video signal can be reproduced and displayed in an accurate aspect ratio without misuse by decoding the VID signal added to the video signal. In addition, even when the video signal is recorded by a VTR, the video signal can be reproduced in an accurate mode without misuse. Further, the VID signal is also recorded in second-generation and third-generation tapes which are obtained through a dubbing by the VTR, so that the video signal can be reproduced in an accurate mode. In addition, even if the video signal is passed through an AC-coupled equipment such as a video selector, an accurate operation can be performed.

Further, according to this invention, even when a video signal which has not yet been added with the ID signal for controlling a frame mode is transmitted in the MUSE broadcasting, the misuse of a user can be prevented by adding the VID signal to the video signal.

Still further, according to this invention, the frame display information on aspect ratio is added to a video signal, so that the user can know a mode of a source signal even using a television image receiver having no automatic identification function for the VID signal.

What is claimed is:

1. An additive information signal inserting device comprising:
   aspect-ratio converting means for receiving a video signal having a first aspect ratio and converting the video signal having the first aspect ratio to a video signal having a second aspect ratio; and
   additive video signal inserting means for receiving the video signal from said aspect-ratio converting means and inserting into the video signal additive video information indicating one of a plurality of different video display frame modes that correspond respectively to the manner in which the video signal output from said aspect-ratio converting means is displayed.

2. The additive information signal inserting device according to claim 1 wherein said plurality of different video display frame modes include a wide-frame mode for inserting a picture of 16:9 aspect ratio into a frame of 4:3 aspect ratio in a reduced scale, a zoom-frame mode for cutting lateral sides of a picture of 16:9 ratio to obtain a picture of 4:3 aspect ratio and displaying it, and a squeeze-frame mode for compressing a picture of 16:9 aspect ratio in a lateral direction and inserting the laterally-compressed picture into a frame of 4:3 aspect ratio.

3. An additive video information inserting device comprising:
   aspect-ratio converting means for receiving a high-definition video signal and converting the high-definition video signal to a conventional video signal; and
   additive video signal inserting means for receiving the conventional video signal from said aspect-ratio converting means and inserting into the conventional video signal additive video information indicating one of a plurality of different video display frame modes that correspond respectively to the manner in which the conventional video signal is displayed.

4. The additive video information inserting device according to claim 3 wherein said plurality of different video display frame modes include a wide-frame mode for inserting a picture of 16:9 aspect ratio into a frame of 4:3 aspect ratio in a reduced scale, a zoom-frame mode for cutting lateral sides of a picture of 16:9 ratio to obtain a picture of 4:3 aspect ratio and displaying it, and a squeeze-frame mode for compressing a picture of 16:9 aspect ratio in a lateral direction and inserting the laterally-compressed picture into a frame of 4:3 aspect ratio.

5. An additive video information inserting device comprising:
   MUSE-NTSC converting means for receiving a MUSE signal and converting the MUSE signal to an NTSC signal; and
   additive video signal inserting means for receiving the NTSC video signal from said MUSE-NTSC converting means and inserting into the NTSC video signal additive video information indicating one of a plurality of different video display frame modes that correspond respectively to the manner in which the NTSC signal is displayed;
   wherein said plurality of different video display frame modes include a wide-frame mode for inserting a picture of 16:9 aspect ratio into a frame of 4:3 aspect ratio in a reduced scale, a zoom-frame mode for cutting lateral sides of a picture of 16:9 ratio to obtain a picture of 4:3 aspect ratio and displaying it, and a squeeze-frame mode for compressing a picture of 16:9 aspect ratio in a lateral direction and inserting the laterally-compressed picture into a frame of 4:3 aspect ratio.

6. An additive video information inserting device comprising:
   aspect-ratio converting means for receiving a video signal having a first aspect ratio and converting the video signal having the first aspect ratio to a video signal having a second aspect ratio; and
   additive video signal inserting means for receiving the video signal from said aspect-ratio converting means and inserting into the video signal additive video information indicating one of a plurality of different video display frame modes that correspond respectively to the manner in which the video signal output from said aspect-ratio converting means is displayed, wherein said additive video signal inserting means comprises controlling means for supplying said aspect-ratio converting means with a control signal for setting said one of the plurality of video display frame modes and generating the additive video signal for the set video display frame mode.

7. The additive video information inserting device according to claim 6 wherein said plurality of different video display frame modes include a wide-frame mode for inserting a picture of 16:9 aspect ratio into a frame of 4:3 aspect ratio in a reduced scale, a zoom-frame mode for cutting lateral sides of a picture of 16:9 ratio to obtain a picture of 4:3 aspect ratio and displaying it, and a squeeze-frame mode for compressing a picture of 16:9 aspect ratio in a lateral direction and inserting the laterally-compressed picture into a frame of 4:3 aspect ratio.

8. An additive video information inserting device comprising:
   aspect-ratio converting means for receiving a video signal having a first aspect ratio and converting the video signal having the first aspect ratio to a video signal having a second aspect ratio;

wide aspect-ratio signal identification inserting means for inserting into the video signal output from said aspect-ratio converting means additive video information representing one of a plurality of different video display frame modes that correspond respectively to the manner in which a video signal having an aspect ratio corresponding to a wide frame is displayed; and controlling means for controlling actuation of said wide aspect-ratio signal identification inserting means on the basis of a signal representing that the video signal having the first aspect ratio is being subjected to a conversion processing by said aspect-ratio converting means;

wherein said plurality of different video display frame modes include a wide-frame mode for inserting a picture of 16:9 aspect ratio into a frame of 4:3 aspect ratio in a reduced scale, a zoom-frame mode for cutting lateral sides of a picture of 16:9 ratio to obtain a picture of 4:3 aspect ratio and displaying it, and a squeeze-frame mode for compressing a picture of 16:9 aspect ratio in a lateral direction and inserting the laterally-compressed picture into a frame of 4:3 aspect ratio.

9. An additive video information inserting device comprising:

aspect-ratio converting means for receiving a video signal having a first aspect ratio and converting the video signal having the first aspect ratio to a video signal having a second aspect ratio;

additive video signal inserting means for receiving the video signal from said aspect-ratio converting means and inserting into the video signal additive video information indicating one of a plurality of different video display frame modes that correspond respectively to the manner in which the video signal output from said aspect-ratio converting means is displayed;

frame display generating means for receiving the additive video information and generating a frame display information for the additive video information; and video signal synthesizing means for synthesizing the frame display information generated by said frame display generating means with the video signal into which the additive video information is inserted.

10. The additive video information inserting device as claimed in claim 9 wherein the frame display information includes at least one of frame, figure, outline, shape and color information corresponding to the video display frame mode.

11. The additive video information inserting device according to claim 9 wherein said plurality of different video display frame modes include a wide-frame mode for inserting a picture of 16:9 aspect ratio into a frame of 4:3 aspect ratio in a reduced scale, a zoom-frame mode for cutting lateral sides of a picture of 16:9 ratio to obtain a picture of 4:3 aspect ratio and displaying it, and a squeeze-frame mode for compressing a picture of 16:9 aspect ratio in a lateral direction and inserting the laterally-compressed picture into a frame of 4:3 aspect ratio.

12. The additive video information inserting device as claimed in any one of the claims 1 to 10 wherein the additive video information is inserted at a predetermined position in a vertical blanking period of the video signal.

13. An additive video information inserting method comprising the steps of:

converting a video signal having a first aspect ratio to a video signal having a second aspect ratio; and inserting into the converted video signal additive video information indicating one of a plurality of different video display frame modes that correspond respectively to the manner in which the video signal is displayed.

14. The additive video information inserting method according to claim 13 wherein said plurality of different video display frame modes include a wide-frame mode for inserting a picture of 16:9 aspect ratio into a frame of 4:3 aspect ratio in a reduced scale, a zoom-frame mode for cutting lateral sides of a picture of 16:9 ratio to obtain a picture of 4:3 aspect ratio and displaying it, and a squeeze-frame mode for compressing a picture of 16:9 aspect ratio in a lateral direction and inserting the laterally-compressed picture into a frame of 4:3 aspect ratio.

15. An additive video information inserting method comprising the steps of:

converting a video signal having a first aspect ratio to a video signal having a second aspect ratio;

inserting into the converted video signal additive video information representing one of a plurality of different video display frame modes that correspond respectively to the manner in which a video signal having an aspect ratio corresponding to a wide frame is displayed; and controlling actuation of said wide aspect-ratio signal identification inserting means on the basis of a signal representing that the video signal having the first aspect ratio is being subjected to a conversion processing.

16. The additive video information inserting method according to claim 15 wherein said plurality of different video display frame modes include a wide-frame mode for inserting a picture of 16:9 aspect ratio into a frame of 4:3 aspect ratio in a reduced scale, a zoom-frame mode for cutting lateral sides of a picture of 16:9 ratio to obtain a picture of 4:3 aspect ratio and displaying it, and a squeeze-frame mode for compressing a picture of 16:9 aspect ratio in a lateral direction and inserting the laterally-compressed picture into a frame of 4:3 aspect ratio.

17. An additive video information inserting method comprising the steps of:

converting a video signal having a first aspect ratio to a video signal having a second aspect ratio;

inserting into the converted video signal additive video information indicating one of a plurality of different video display frame modes that correspond respectively to the manner in which the video signal is displayed;

receiving the additive video information and generating a frame display information for the additive video information; and synthesizing the frame display information with the video signal into which the additive video information is inserted.

18. The additive video information inserting method according to claim 17 wherein said plurality of different video display frame modes include a wide-frame mode for inserting a picture of 16:9 aspect ratio into a frame of 4:3 aspect ratio in a reduced scale, a zoom-frame mode for cutting lateral sides of a picture of 16:9 ratio to obtain a picture of 4:3 aspect ratio and displaying it, and a squeeze-frame mode for compressing a picture of 16:9 aspect ratio in a lateral direction and inserting the laterally-compressed picture into a frame of 4:3 aspect ratio.

* * * * *